(12) United States Patent
Muramoto

(10) Patent No.: US 6,798,536 B1
(45) Date of Patent: Sep. 28, 2004

(54) APPARATUS FOR DISPLAYING TONE CURVE AND APPARATUS FOR ADJUSTING TONE CURVE

(75) Inventor: Yasuhiko Muramoto, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/364,265

(22) Filed: Jul. 30, 1999

(30) Foreign Application Priority Data

Aug. 4, 1998 (JP) .......................................... 10-220671

(51) Int. Cl.$^7$ ............................. G06F 15/00; G06K 1/00
(52) U.S. Cl. ..................... 358/1.9; 358/3.27; 358/521; 382/254; 345/594; 345/600
(58) Field of Search ................................. 345/593–594, 345/597, 600, 602; 358/518, 521, 522, 1.9, 530, 3.27; 382/254

(56) References Cited

U.S. PATENT DOCUMENTS

| | | | | |
|---|---|---|---|---|
| 4,390,778 A | * | 6/1983 | Toivonen | 235/89 R |
| 5,123,060 A | * | 6/1992 | Cho et al. | 382/51 |
| 5,255,085 A | * | 10/1993 | Spence | 358/527 |
| 5,283,671 A | * | 2/1994 | Stewart et al. | 358/532 |
| 5,287,418 A | * | 2/1994 | Kishida | 382/169 |
| 5,333,244 A | * | 7/1994 | Harashima | 345/419 |
| 5,375,201 A | * | 12/1994 | Davoust | 715/503 |
| 5,383,032 A | * | 1/1995 | Eguchi et al. | 358/448 |
| 5,406,379 A | * | 4/1995 | Kingsley et al. | 358/3.1 |
| 5,416,890 A | | 5/1995 | Beretta | |
| 5,541,029 A | * | 7/1996 | Iwata et al. | 430/45 |
| 5,581,370 A | * | 12/1996 | Fuss et al. | 358/447 |
| 5,600,778 A | * | 2/1997 | Swanson et al. | 345/762 |
| 5,696,889 A | * | 12/1997 | Morikawa | 358/1.9 |
| 5,751,434 A | * | 5/1998 | Narendranath et al. | 358/298 |
| 6,097,836 A | * | 8/2000 | Inoue | 382/165 |
| 6,362,829 B1 | * | 3/2002 | Omvik et al. | 345/593 |
| 6,469,805 B1 | * | 10/2002 | Behlok | 358/1.9 |
| 6,480,202 B1 | * | 11/2002 | Deguchi et al. | 345/600 |
| 6,484,631 B2 | * | 11/2002 | Degani et al. | 101/171 |
| 2002/0126147 A1 | * | 9/2002 | Lavendel et al. | 345/764 |
| 2003/0012437 A1 | * | 1/2003 | Zaklika et al. | 382/169 |

FOREIGN PATENT DOCUMENTS

| | | |
|---|---|---|
| EP | 0 377 386 A2 | 7/1990 |
| GB | 2 305 833 B1 | 4/1997 |
| JP | 9-149271 | 6/1997 |
| JP | 10-23264 | 1/1998 |

OTHER PUBLICATIONS

Adobe Systems, Adobe Photoshop 5.0 User Guide for Macintosh and Windows, 1998, Abode Systems, Incorporated, p. 105–133.*
Guan et al. Volume–based Tumor Neurosurgery Planning in the Virtual Workbench, IEEE, 1998.*
Japanese Abstract No. 10322551, dated Dec. 4, 1998.
Japanese Abstract No. 09261493 dated Oct. 3, 1997.

* cited by examiner

Primary Examiner—Kimberly Williams
Assistant Examiner—Melanie Vida
(74) Attorney, Agent, or Firm—Sughrue Mion, PLLC

(57) ABSTRACT

An image for adjusting a tone curve includes an overall tone curve image including a tone curve of dot gains in a predetermined full scale with respect to all input image gradation values of image data, and an enlarged tone curve image including a tone curve of enlarged dot gains in a full scale, smaller than the predetermined full scale, which represent a highlight area of gradations which is part of the entire tone curve. The user can finely adjust and correct the tone curve in the highlight area while viewing the overall tone curve.

21 Claims, 8 Drawing Sheets

APPARATUS FOR DISPLAYING TONE CURVE AND APPARATUS FOR ADJUSTING TONE CURVE

BACKGROUND OF THE INVENTION

1. Field of the Invention

The present invention relates to a display apparatus for displaying a tone curve representing the characteristics of output image gradation values with respect to input image gradation values, and a tone curve adjusting apparatus for adjusting the tone curve displayed on the display apparatus in response to displayed image manipulations entered via a manual command input device.

2. Description of the Related Art

It has heretofore been customary in the art of printing and platemaking to generate a color proof carrying a color image on a proof sheet for examining colors and making color corrections, with a proofer such as a color printer or the like before a colored printed material with a color image printed on a print sheet is produced as a final finished product by a color printing machine such as a rotary press.

The proofer is used because it does not require films and printing plates that would be needed by printing machines and can easily generate as many hard copies carrying color images on proof sheets, i.e., color proofs, as required at a low cost within a short period of time.

In the production of color proofs, tone curves are adjusted to equalize the colors and densities of an image on a colored printed material and the colors and densities of an image on a color proof to each other with respect to image data that have been inputted to the proofer.

FIG. 8 of the accompanying drawings illustrates, by way of example, a displayed image for a conventional tone curve adjustment process on a display unit of a tone curve adjusting apparatus.

As shown in FIG. 8, the displayed image, denoted at 2, for tone curve adjustment has a grid of vertical and horizontal gradations spaced at intervals of 10%. The displayed image 2 also includes numerical values of −20, 0, +20 representing some of the horizontal gradations which indicate a full scale of dot gains over a range of ±20% along the vertical axis, and numeral values of 0, 10, 20, 50, 70, 90, 100 representing some of the vertical gradations which indicate a full scale of input image data gradations (input gradations) over a range from 0 to 100%.

The displayed image 2 further includes a tone curve 4 plotted against the gird of vertical and horizontal gradations. The shape of the tone curve 4 can be changed or adjusted by dragging any desired position on the tone curve 4 with a mouse used as an input device.

Usually, a range for correcting dot gains is about ±10%. Since the full scale of dot gains along the vertical axis extends over the range of ±20% in FIG. 8, desired dot gains can be adjusted and visually confirmed in the entire range from 0 to 100% of the full scale of input gradations along the horizontal axis.

There are instances where the user is desirous of confirming part of the tone curve, e.g., a highlight area in an image of skin color for which the human visual sensitivity is high, a shadow area in a scenery image at night, or an intermediate gradation area in a scenery image of leaves in early spring. In those situations, since the range (full scale) of input image gradation values of the conventional tone curve shown in FIG. 8 is wide, the user tends to find the tone curve difficult to visually grasp easily and quickly in confirming a partial range of the input image gradation values such as for a highlight area, a shadow area, or an intermediate gradation area, and also tends to find the tone curve hard to adjust or correct in a partial range of the input image gradation values.

SUMMARY OF THE INVENTION

It is therefore an object of the present invention to provide a display apparatus for displaying a tone curve such that even a partial range of the tone curve can be displayed for being visually grasped easily and quickly.

Another object of the present invention is to provide a tone curve adjusting apparatus for allowing even a partial range of input image gradation values to be adjusted and corrected finely.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
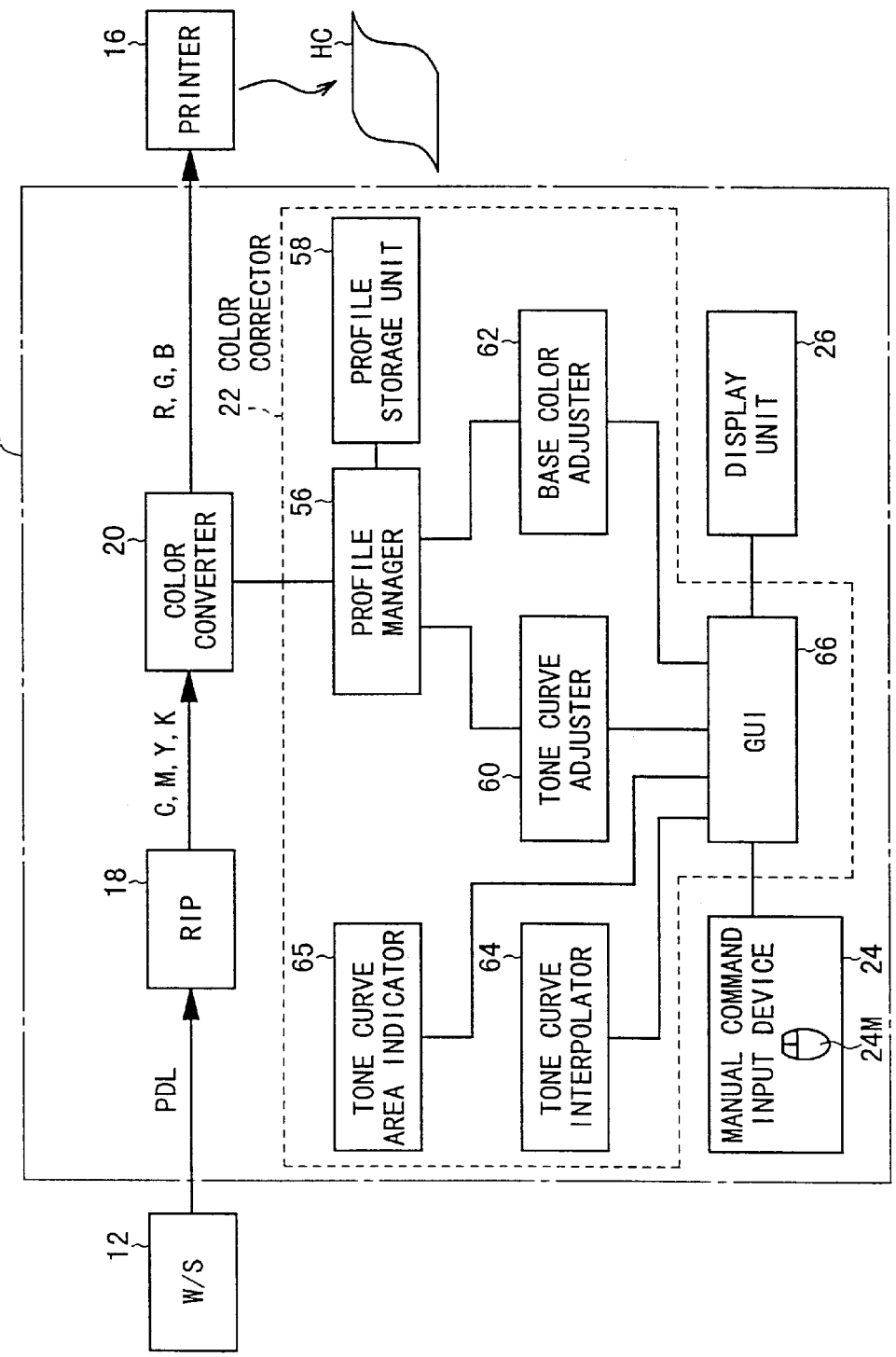
FIG. 1 is a block diagram of a proof system according to an embodiment of the present invention.

FIG. 1 shows in block form a proof system 10 according to an embodiment of the present invention.

As shown in FIG. 1, the proof system 10 basically comprises a workstation 12 functioning as a page make-up apparatus, a host computer 14 functioning as a tone curve adjusting apparatus, and a printer 16 functioning as a proofer.

The workstation 12 edits characters, line drawings, and images captured by a scanner or the like (not shown) on an image displayed on a display unit (not shown), and generates PDL (Page Description Language) data descriptive of one page of image information including positional information, color and density information, etc.

The generated PDL data is supplied to a raster image processor (RIP) 18 of the host computer 14. The raster image processor 18 develops the PDL data into image data in C (cyan), M (magenta), Y (yellow), K (black) as scanning image data.

The host computer 14 comprises a main section including the raster image processor 18, a color converter 20 having color conversion LUTs (Look Up Tables), and a color corrector 22 functioning as a display control means, a manual command input unit 24 including a keyboard, a mouse 24M, etc. and connected to the color corrector 22, and a display unit 26 also functioning as a tone curve display apparatus, the display unit 26 comprising a color CRT display unit or the like.

Figure 2:
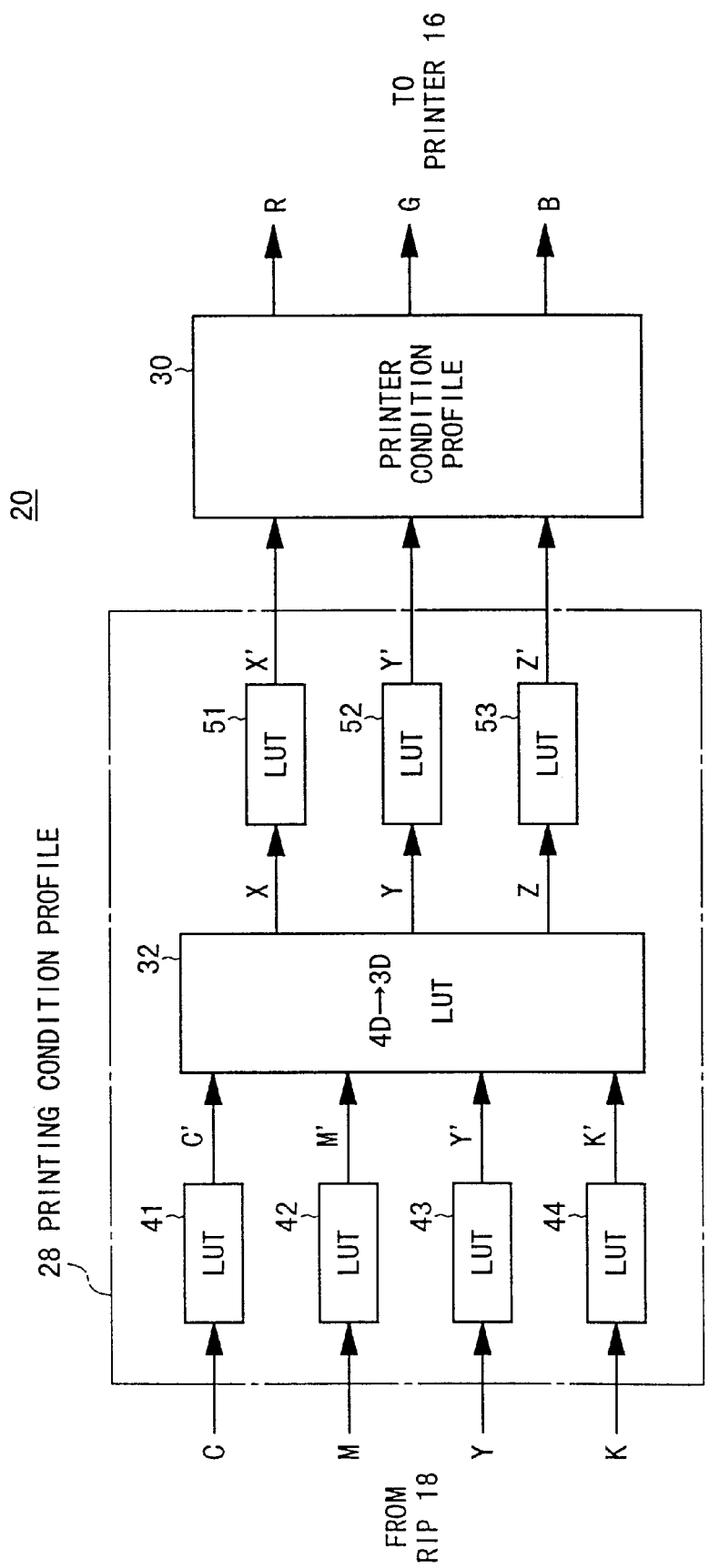
FIG. 2 is a block diagram of a printing condition profile and a printer condition profile which have been merged and established in a color converter in the proof system shown in FIG. 1.

FIG. 2 shows the color converter 20 in detail. The color converter 20 converts C, M, Y, K image data supplied from the raster image processor 18 to R (Red), G (Green), B (Blue) image data for the printer 16 with a printing condition profile 28 and a printer condition profile 30.

The printing condition profile 28 serves as a color converting means including a color conversion table (four-dimensional-to-three-dimensional conversion lookup table) 32 for effecting conversion between colors depending on a device (a printer, inks, etc.), on a printed material produced by a printing machine (not shown) which is to be simulated by a hard copy HC outputted as a proof by the printer 16, and colors not depending on a device, such as colorimetric values or the like.

The printer condition profile 30 serves as a color converting means including a color conversion table for effecting color conversion between colors not depending on a device, such as colorimetric values or the like, and colors depending on a device, on a hard copy HC outputted from the printer 16.

In the printing condition profile 28, C, M, Y, K image data (C, M, Y, K) are converted to gradation-converted C, M, Y, K image data (C', M', Y', K') by one-dimensional LUTs (tone curve adjusting LUTs) 41, 42, 43, 44 each incorporating a tone curve (a curve for converting input gradation values in a range from 0 to 100% to output gradation values (halftone dot %) in a range from 0 to 100%). The gradation-converted C, M, Y, K image data (C', M', Y', K') are then converted to colorimetric data (X, Y, Z) by the color conversion table 32. The colorimetric data (X, Y, Z) converted to colorimetric data (X', Y', Z') by one-dimensional LUTs 51, 52, 53 for base color correction.

The LUTs 51, 52, 53 for base color correction are tables for correcting the difference between the base color of a sheet to be used by the printing machine (not shown) and the base color of a sheet used to print color patches thereon which have been used to generate the color conversion table 32. The base color difference represents a colorimetric value difference produced when sheets of art paper from different lots are colorimetrically measured by a colorimeter or the like.

Actually, the printing condition profile 28 and the printer condition profile 30 are merged by a profile manager 56 of the color corrector 22, and established as a single lookup table in the color converter 20.

To the profile manager 56 of the color corrector 22, there are connected a profile storage unit 58 as a mass storage unit for storing the printing condition profile 28 and the printer condition profile 30, a tone curve adjuster 60 for adjusting or correcting the data in the LUTs 41, 42, 43, 44, and a base color adjuster 62 for adjusting or correcting the data in the LUTs 51, 52, 53.

The color corrector 22 also has a tone curve interpolator 64 which is used when the data in the LUTs 41, 42, 43, 44 are adjusted or corrected by the tone curve adjuster 60, and a tone curve area indicator 65 as an area indicating means for indicating an arbitrary area of gradations of tone curves.

The color corrector 22 further includes a graphical user interface (GUI) 66 connected to the base color adjuster 62, tone curve adjuster 60, the tone curve interpolator 64, the tone curve area indicator 65, the display unit 26, and the manual command input unit 24.

The user manipulates an image displayed on the display screen of the display unit 26 with the manual command input unit 24 via the GUI 66 for making various adjustments such as tone curve adjustments, base color adjustments, etc. and indicating tone curve areas in a user-friendly control environment.

R, G, B image data converted from C, M, Y, K image data by the color converter 20 are supplied as scanning image data to the printer 16.

The printer 16, which is of the laser exposure, thermal development and transfer type, has three semiconductor lasers which emit respective light beams that have been intensity-modulated by the respective R, G, B image data. The emitted light beams are applied to a donor (not shown) to form a latent image thereon. The donor exposed to the light beams is then wetted with a small amount of water, and an image receiver sheet is applied to the donor and heated to develop the latent image. Dyes produced by the image development are transferred as a visible color image to the image receiver sheet. After the color image has been transferred to the image receiver sheet, the image receiver sheet is peeled off the used donor, thus providing a hard copy HC as a high-quality color print.

Figure 3:
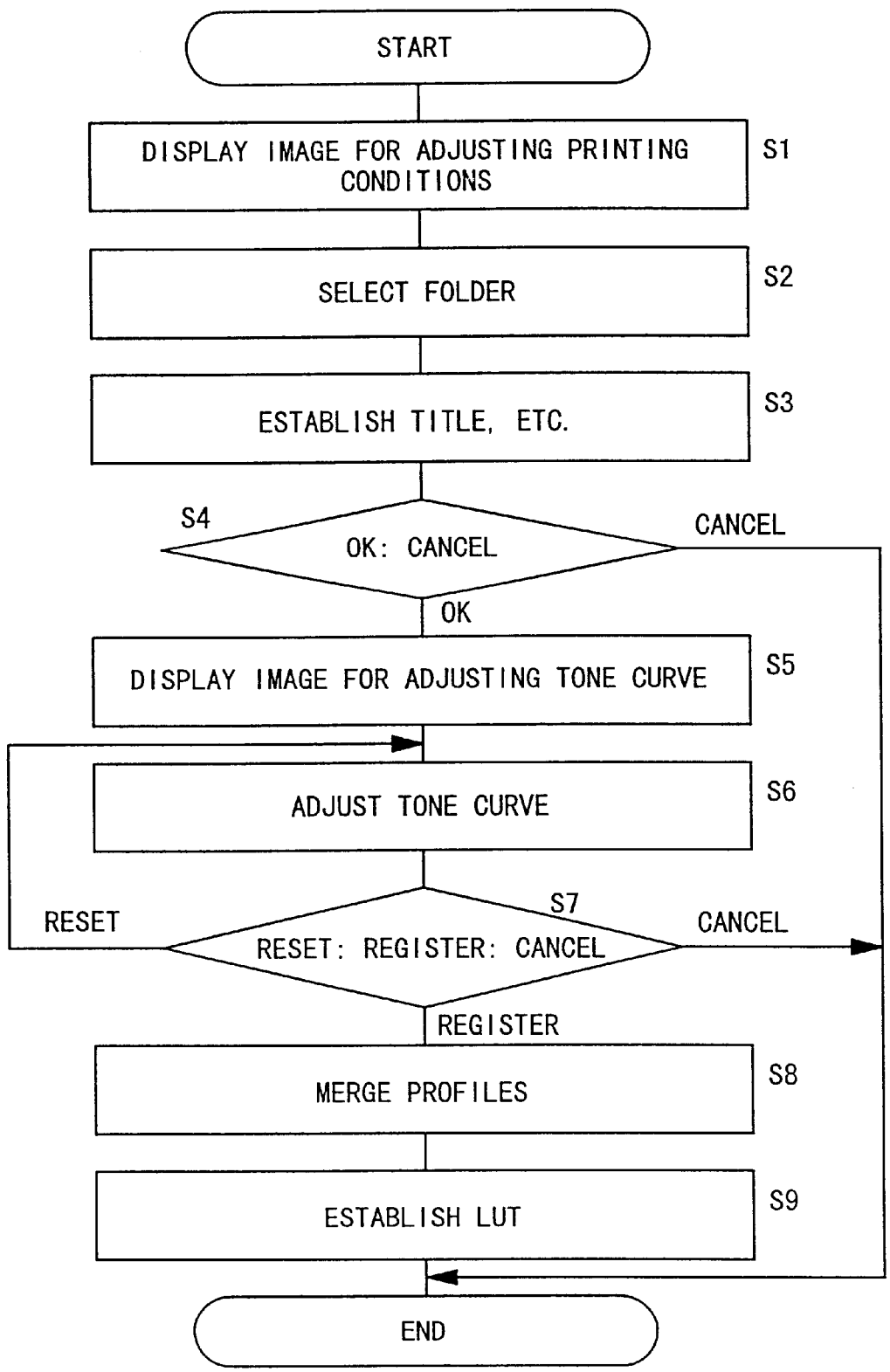
FIG. 3 is a flowchart of a tone curve adjusting procedure.

A process of adjusting the printing condition profile 28 using the one-dimensional tone curve adjusting LUTs 41, 42, 43 will be described below with reference to FIG. 3.

Figure 4:
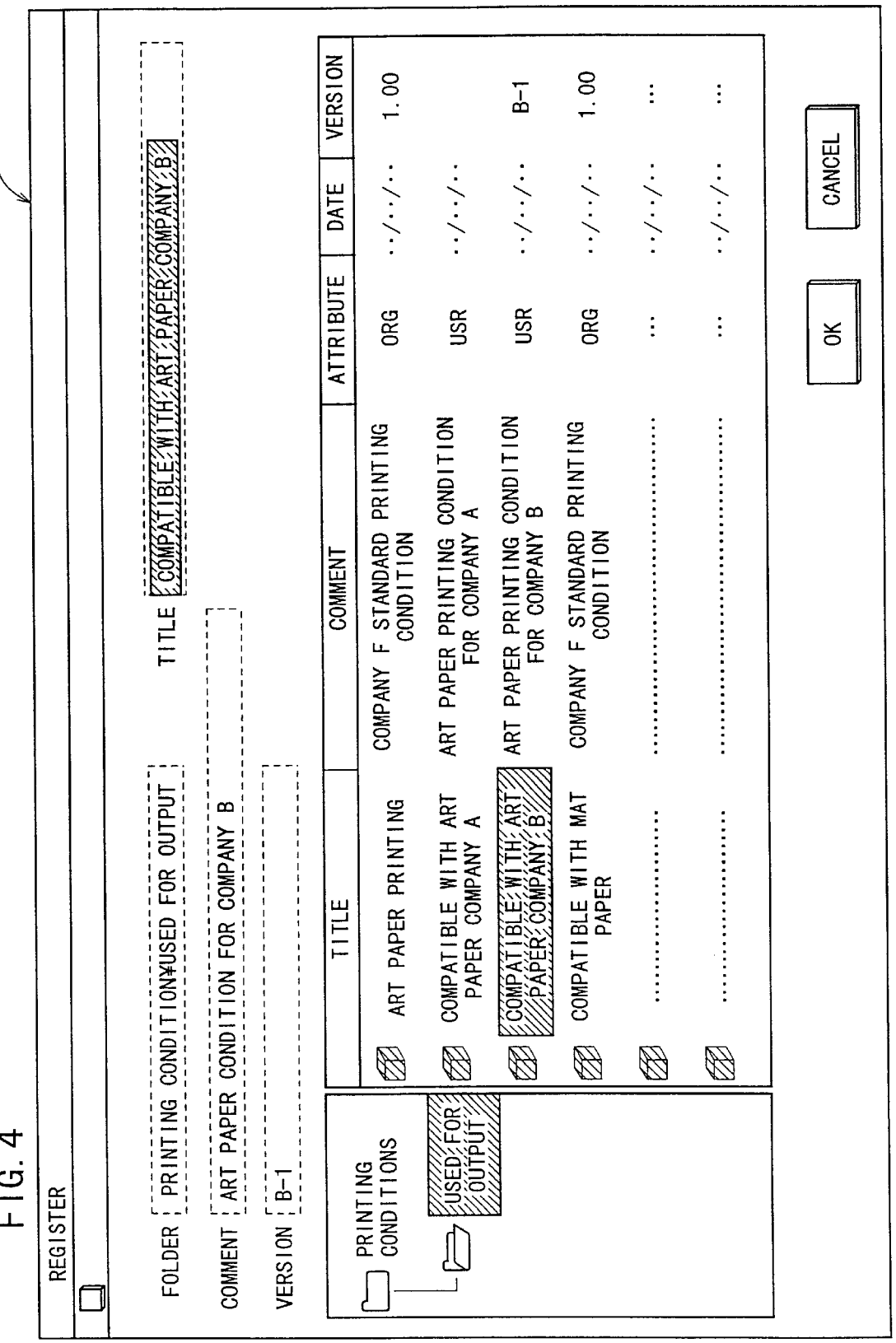
FIG. 4 is a view showing, by way of example, an image for selecting printing conditions.

First, the user selects an image for adjusting printing conditions via the manual command input unit 24, whereupon an image 200 for selecting printing conditions as shown in FIG. 4 is displayed on the display unit 26 in step S1.

Then, the user selects a folder "USED FOR OUTPUT" from a left column in the image 200 for selecting printing conditions in step S2.

A list of files stored in the folder "USED FOR OUTPUT" is now displayed. In FIG. 4, file titles "ART PAPER PRINTING", "COMPATIBLE WITH ART PAPER COMPANY A", COMPATIBLE WITH ART PAPER COMPANY B" and "COMPATIBLE WITH MAT PAPER" are already set forth in a fine title column, and these file titles are accompanied by comments "COMPANY F STANDARD PRINTING CONDITION", "ART PAPER PRINTING CONDITION FOR COMPANY B", and "COMPANY F STANDARD PRINTING CONDITION" set forth in a comment column. Those files which are marked with an attribute "ORG" in an attribute column represent files registered as system files in the host computer 14 from the outset, and those files which are marks with an attribute "USR" represent files generated on the host computer 14 by the user. If the user instructs the host computer 14 to register a file which has been recognized as the attribute "ORG" by the system, then a warning dialog is displayed, indicating to the user that the user cannot modify and register the file under the same title.

In a date column, dates of generation (updating) of files, e.g., "../../.."="Jun. 30, 1998", are displayed. Version numbers (version codes) of files are displayed in a version column.

In the image 200 for selecting printing conditions shown in FIG. 4, the file title "COMPATIBLE WITH ART PAPER COMPANY B" is selected. The selected file title can be changed when the user reselects another file title in the file list with the mouse 24M. The user can newly establish a title, a comment, and a version in respective input cells in step S3.

When the user then presses an "OK" button in the image 200 for selecting printing conditions with the mouse 24M, places a mouse pointer (not shown) on the "OK" button, clicks a left switch on the mouse 24M (OK: step S4), and then presses a tone curve adjustment button (not shown), then an image 202 (see FIG. 5) for confirming tone curves for all the colors C, M, Y, K is displayed on the display unit 26 in step S5.

If "C" is selected in a correction color selection check box which allows the user to select the color C, the color M, the color K, or all the colors in the image 202 for confirming tone curves for all the colors C, M, Y, K, then an image 204 (see FIG. 6) for adjusting or editing a tone curve for the color C is displayed on the display unit 26.

In the image 202 for confirming tone curves for all the colors C, M, Y, K and the image 204 for adjusting a tone curve for the color C, the folder title "PRINTING CONDITION USED FOR OUTPUT" selected in step S2 and the file title "COMPATIBLE WITH ART PAPER COMPANY B" selected in step S3 are displayed.

Contents of the image 202 for confirming tone curves for all the colors C, M, Y, K and the image 204 for adjusting a tone curve for the color C, and a process of adjusting a tone curve in response to displayed image manipulations entered via the manual command input device 24 in step S6 will be described in detail blow.

The process of adjusting a tone curve is carried out mainly by the tone curve adjuster 60 of the color corrector 22.

Figure 5:
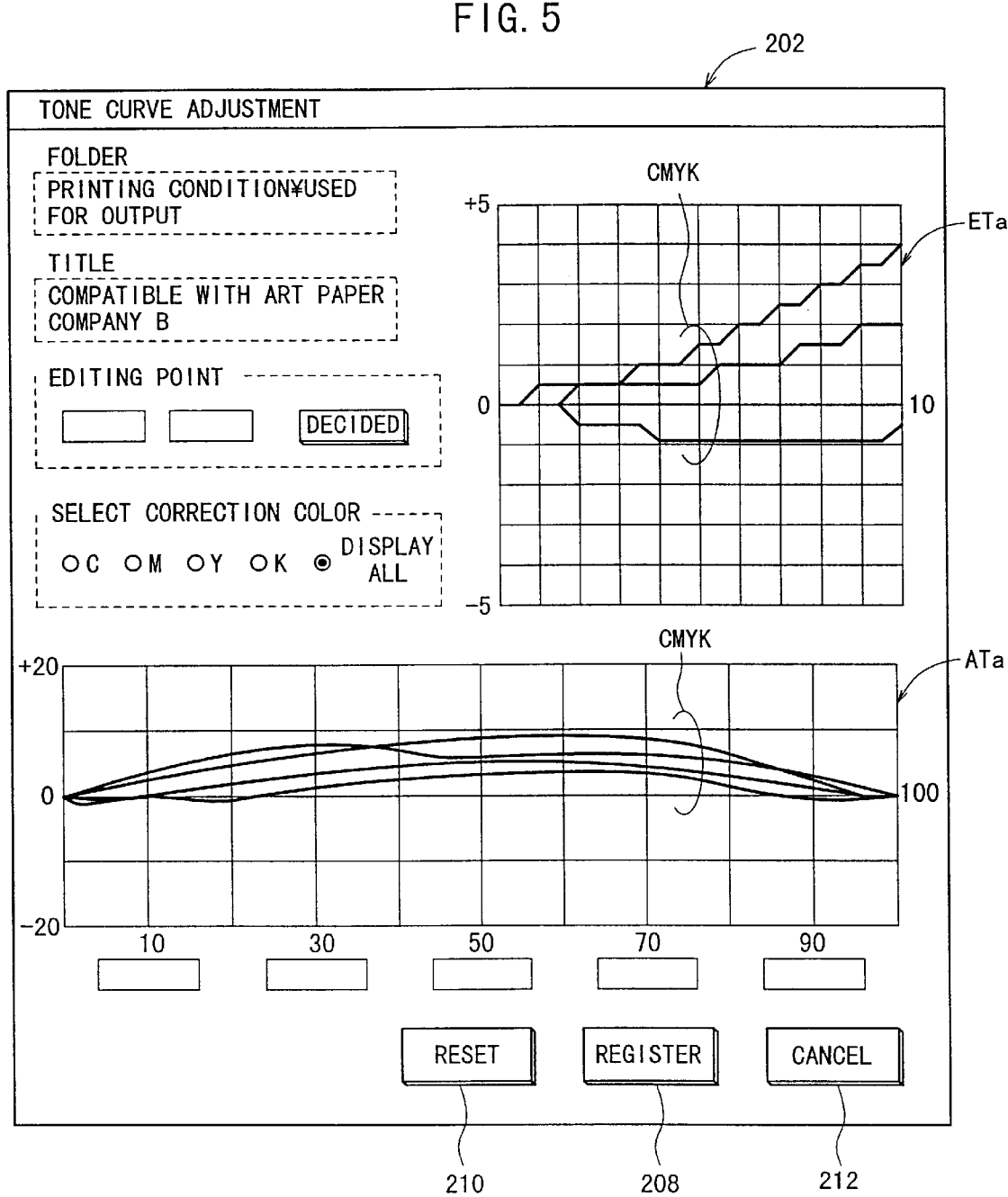
FIG. 5 is a view showing, by way of example, an image for confirming tone curves for all the colors C, M, Y, K.

The image 202 for confirming tone curves for all the colors C, M, Y, K shown in FIG. 5 includes, in its lower central region, an overall tone curve image ATa (not enlarged) including tone curves C, M, Y, K of dot gains (full scale: ±20%) as output image gradation values with respect to all input image gradation values (full scale: 0–100%) of C, M, Y, K image data (C, M, Y, K) inputted from the raster image processor 18 to the printing condition profile 28 (see FIG. 2).

The image 202 for confirming tone curves for all the colors C, M, Y, K shown in FIG. 5 also includes, in its upper right region, an enlarged tone curve image ETa including tone curves C, M, Y, K of enlarged dot gains (full scale: ±5%) which represent a highlight area of gradations (input gradations 0–10%: highlight area) which is part of the entire tone curves C, M, Y, K. In the enlarged tone curve image ETa, the vertical and horizontal graduations per 1% are about four times the vertical and horizontal graduations in the overall tone curve image ATa (not enlarged). With the highlight area displayed at an enlarged scale for observation, the gradations of a skin-color image and a scenery image including a blue sky can easily be adjusted.

Figure 6:
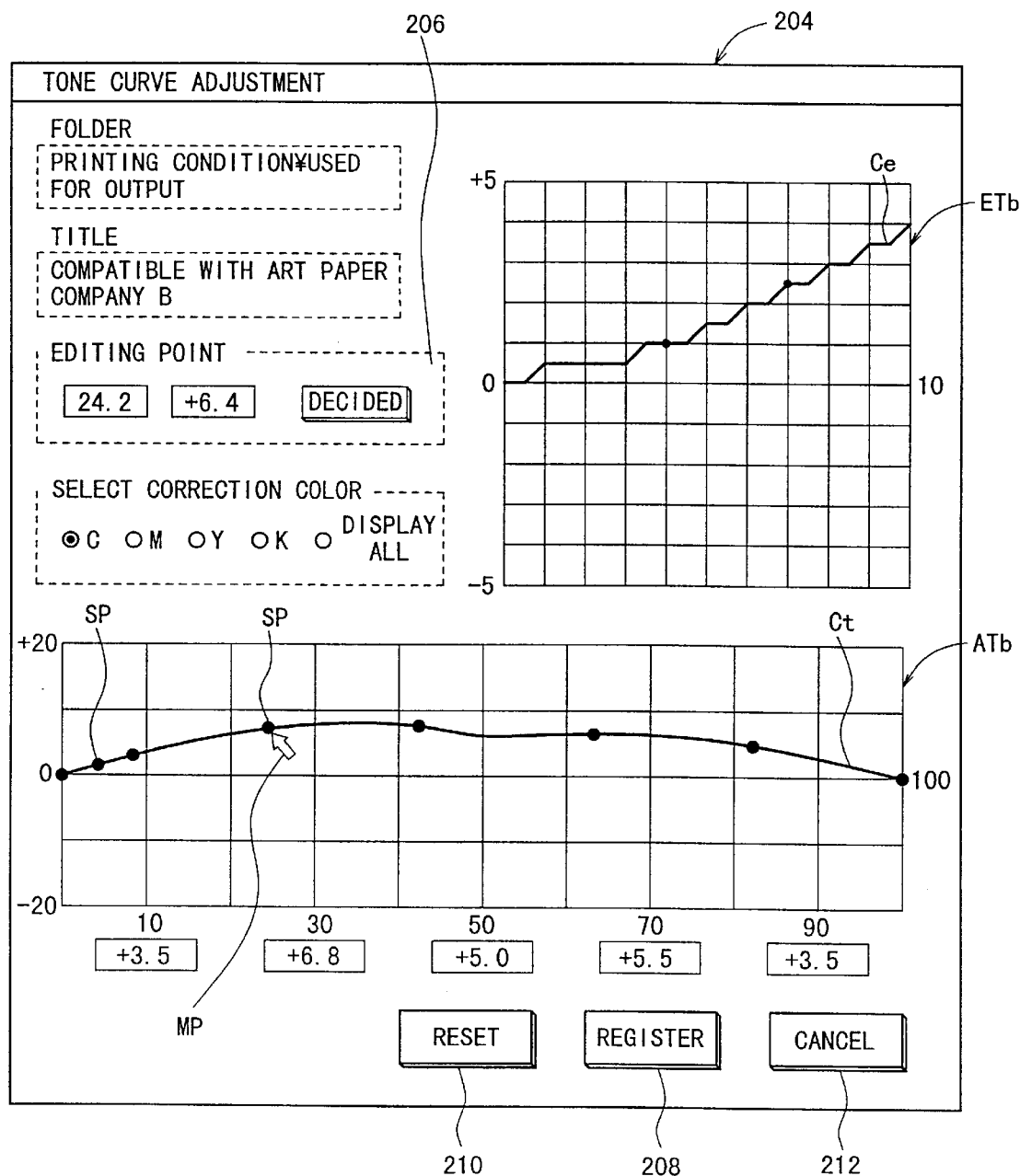
FIG. 6 is a view showing, by way of example, an image for adjusting a tone curve for the color C.

The image 204 for adjusting a tone curve for the color C shown in FIG. 6 includes, in its lower central region, an overall tone curve image ATb (not enlarged) including a tone curve Ct of dot gains (full scale: ±20%) with respect to all input image gradation values (full scale: 0–100%) of C image data (C) inputted from the raster image processor 18 to the one-dimensional LUT 41 of the printing condition profile 28. The image 204 for adjusting a tone curve for the color C also includes, in its upper right region, an enlarged tone curve image ETb including a tone curve Ce of enlarged dot gains (full scale: ±5%) which represent a highlight area of gradations (input gradations 0–10%) which is part of the entire tone curve Ct.

In the enlarged tone curve image ETb, the vertical and horizontal graduations per 1% are about four times the vertical and horizontal graduations in the overall tone curve image ATb (not enlarged).

The user places a mouse pointer MP on either one of the tone curves Ce, Ct in the enlarged tone curve image ETb and the overall tone curve image ATb in the image 204, and drags the mouse pointer MP with a left switch on the mouse 24M to move a sampling point SP on the tone curve Ce or Ct vertically to increase or reduce the dot gain or horizontally along the tone curve Ce or Ct. In the illustrated embodiment, eight sampling points SP having input gradation values of "0", "3.9", "8.6", "24.2", "43.1", "61.9", "83.1", and "100" are selected on the tone curve Ct. Actually, since input image gradations of the C image data (C) are 8 bits =256 gradations with each gradation corresponding to 100/255=0.3921, the sampling points SP on the gradations (horizontal axis) are selected as multiples of 0.3921. The vertical axis is marked with graduations of 0.5%.

In FIG. 6, the sampling point SP presently selected by the mouse pointer MP is displayed as an editing point in an editing point column 206 above the overall tone curve image ATb. The editing point column 206 displays an input gradation value (24.2 in FIG. 6) and a dot gain (+6.4 in FIG. 6) at the input gradation value, the dot gain being an overall dot gain as described below.

In the illustrated embodiment, the displayed values of the vertical axes of the tone curves Ct, Ce are equal to the values of the dot gains in the one-dimensional LUT 41. However, the dot gain "+6.4" displayed in the editing point column 206, and the dot gains "+3.5" and "+6.8" displayed below the input gradations "10" and "30" on the horizontal axis of the overall tone curve image ATb are of values (overall dot gains) produced by merging the printing condition profile 28 and the printer condition profile 30 with the profile manager 56. This is to meet the user's demand for recognizing the dot gain (overall dot gain) on a hard copy HC (see FIG. 1) achieved by adjusting the present tone curves.

In the example shown in FIG. 6, a dot gain between sampling points SP is automatically calculated by the tone curve interpolator 64 each time a sampling point SP is traversed, and accordingly an overall dot gain is automatically calculated by merging the printing condition profile 28 and the printer condition profile 30, after they are corrected, with the profile manager 56.

For example, in FIG. 6, when the mouse pointer MP moves a sampling point SP from SP [input gradation, dot gain]=SP [24.2, +6.4] upwardly to SP [24.2, +10], adjusted tone curves Ct, Ce where the values between the sampling point SP=[8.6, +3.0] and SP [43.1, +6.5], which are adjacent to upwardly move sampling point SP [24.2, +10]), are smoothly interpolated and displayed instantaneously on a real-time basis.

As described above, in the image 202 for confirming tone curves for all the colors C, M, Y, K and the image 204 for adjusting a tone curve for the color C, as shown in FIGS. 5 and 6, dot gains with respect to all input image gradation values (0–100%) of the inputted C image data (C) are expressed as the tone curve Ct and displayed as the overall tone curve image ATb on the display unit 26, and the tone curve Ce in the enlarged tone curve image ETb is also simultaneously displayed on the display unit 26. Therefore, it is possible for the user to adjust the tone curve Ce in the highlight area in the enlarged tone curve image ETb while viewing the overall tone curve Ct displayed in the overall tone curve image ATb. Consequently, the tone curve can be adjusted and corrected finely in the highlight area where the human visual sensitivity is high.

When the tone curves C, M, Y, K, Ce in the enlarged tone curve images ETa, ETb in the highlight area of partial gradations or the tone curves C, M, Y, K, Ct in the overall tone curve images ATa, ATb of all gradations are adjusted, the adjusted result is automatically reflected and displayed on a real-time basis in both the tone curves C, M, Y, K, Ce in the enlarged tone curve images ETa, ETb and the tone curves C, M, Y, K, Ct in the overall tone curve images ATa, ATb. Thus, the user can visually recognize the adjusted result in both partial and overall areas, and find it easy to adjust the tone curves.

In the overall tone curve images ATa, ATb and the enlarged tone curve images ETa, ETb, the dot gains on the vertical axis may be displayed as halftone dot % representing gradations of output image data. If the dot gains on the vertical axis are displayed as halftone dot %, then a graph is plotted in which output gradations increase in an accumulative manner with respect to input gradations. Stated otherwise, a graph produced by adding dot gains to a graph having such characteristics that output image gradation values (0–100) linearly vary with respect to input image gradation values (0–100) becomes a graph with displayed halftone dot %, i.e., a tone curve having the characteristics of output image gradation values (0–100) with respect to input image gradation values (0–100).

In the image 202 for confirming tone curves for all the colors C, M, Y, K and the image 204 for adjusting a tone curve for the color C, as shown in FIGS. 5 and 6, if the user clicks on a reset button 210, then a confirmation dialog log is displayed for the user to confirm the resetting, and thereafter the tone curve of the color being presently edited changes to a straight line along the dot gain=0, and only two sampling points SP, i.e., a highlight point (gradation=0%) and a shadow point (gradation=100%), are displayed in the image 204.

If the user places the mouse pointer MP on a sampling point SP and clicks on a right switch on the mouse 24M, then the sampling point SP is deleted. If the user clicks on the right switch on the mouse 24M at any arbitrary position off the sampling points SP on the tone curve Ct or Ce, then a sampling point SP is added to the clicked arbitrary position.

Display cells for overall dot gains that are adjusted values at 10%, 30%, 50%, 70%, and 90% display the values for a color being edited or adjusted only in an editing mode in the image 204 shown in FIG. 6. When the tone curves for all the colors are displayed in the image 202 shown in FIG. 5, those display cells display a blank.

If a registration button 208 is clicked after the tone curves Ct, Ce have been adjusted (step S7: register), then the profile manager 56 merges the printing condition profile 28 including the one-dimensional LUT 41 with the tone curve adjusted and the printer condition profile 30 in step S8, and thereafter a lookup table representing the combined profile is established in the color converter 20 in step S9.

In this manner, the tone curves of all the colors C, M, Y, K can be adjusted individually. When the user clicks on the registration button 208, the profile manager 56 merges the printing condition profile 28 including the one-dimensional LUTs 41, 42, 43, 44 with the tone curves adjusted and the printer condition profile 30, and thereafter a lookup table representing the combined profile is established in the color converter 20.

The printing condition profile 28 and the printer condition profile 30, before they are merged, are stored in the profile storage unit 58.

In the embodiment described above, an area where partial gradations of a tone curve are displayed on an enlarge scale is a highlight area that is set as a default value by the tone curve area indicator 65 as the area indicating means. However, such an area is not limited to a highlight area. In the example shown in FIG. 6, at the sampling point SP [24.2, +6.4] pointed by the mouse pointer MP, when the user double-clicks on the mouse 24M, the image 204 is changed as shown in FIG. 7, displaying an enlarged image ETb around the sampling point SP [24.2, +6.4], which includes an enlarged tone curve Ce with the sampling point SP [24.2, +6.4] at the center of the enlarged image ETb.

Figure 7:
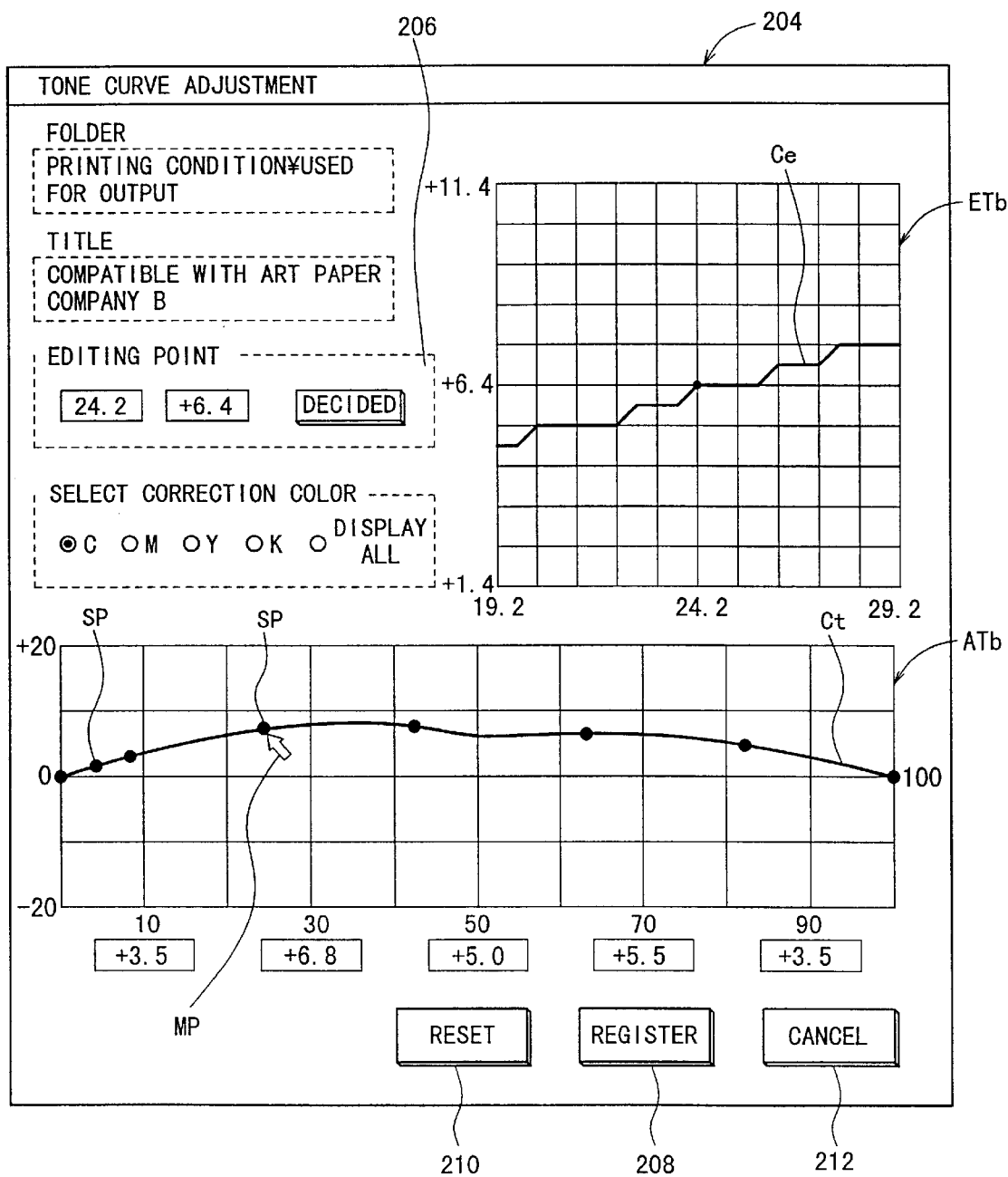
FIG. 7 is a view showing, by way of example, another image for adjusting a tone curve for the color C.
Figure 8:
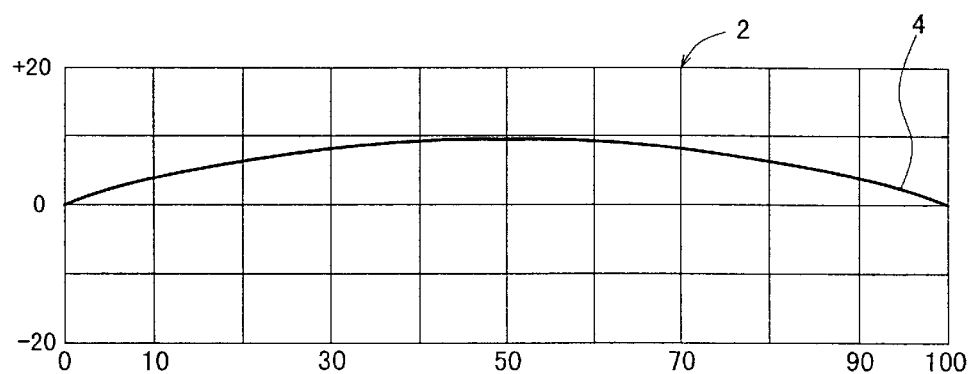
FIG. 8 is a view showing, by way of example, another image for adjusting a tone curve according to a conventional tone curve adjustment process.

As shown in FIG. 7, the ranges of input image gradation values and output image gradation values (dot gains) of the enlarged image ETb are automatically set respectively to an input image gradation range of 24.2±5 and a dot gain range of +6.4±5 by the tone curve area indicator 65. By thus enlarging an intermediate gradation area for observation rather than the highlight area, the user finds it easy to adjust gradations in a scenery image of leaves in early spring, for example.

Although not shown, when a shadow area is displayed at an enlarged scale, it is made easy to adjust gradations in a shadow area in a scenery image at night.

In an apparatus for displaying a tone curve according to the present invention, as described above, since partial gradations of a tone curve are displayed at an enlarged scale by the display control means, the range of a portion of the tone curve can be displayed for easy observation.

The display control means simultaneously displays enlarged partial gradations of the tone curve and overall gradations of the tone curve. Therefore, the user can simultaneously view both the enlarged partial gradations and the overall gradations of the tone curve on the display screen.

If a portion of the tone curve represents a highlight area, then the user can view only the highlight area where the human visual sensitivity is high, at an enlarged scale.

Inasmuch as an arbitrary area of gradations of a tone curve can be indicated by the area indicating means, the user can view a desired gradation area at an enlarged scale.

It is possible for the user to view output image gradation values as dot gains.

In an apparatus for adjusting a tone curve according to the present invention, since partial gradations of a tone curve are displayed at an enlarged scale by the display control means, the tone curve can be adjusted and corrected finely at partial gradations of the tone curve.

Enlarged partial gradations of the tone curve and overall gradations of the tone curve can simultaneously be displayed by the display control means simultaneously displays. Therefore, the user can adjust only the enlarged partial gradations while viewing the overall tone curve on the display screen.

According to the present invention, furthermore, when the tone curve of enlarged partial gradations or the tone curve of overall gradation is adjusted, the adjusted result is reflected and displayed in both the tone curve of enlarged partial gradations and the tone curve of overall gradation. Thus, the user finds it easy to adjust the tone curves.

Enlarged partial gradations may represent a highlight area, and may be indicated by the area indicating means.

It is possible to display output image gradation values as dot gains.

The range of a portion of the tone curve to be displayed at an enlarged scale may be selected as desired from a highlight area, an intermediate gradation area, and a shadow area.

Of course, the tone curve of overall gradation values can also be adjusted in the displayed image of the tone curve of overall gradation values ranging from the highlight area to the shadow area.

Although certain preferred embodiments of the present invention have been shown and described in detail, it should be understood that various changes and modifications may be made therein without departing from the scope of the appended claims.

What is claimed is:

1. An apparatus comprising:

a tone curve display controller configured to display a tone curve representing characteristics of output image gradation values with respect to input image gradation values; and display control means for displaying partial gradations of the tone curve at an enlarged scale.

2. The apparatus of claim 1 displaying multiple tone curves simultaneously for different colors and the display control means displaying multiple partial gradations of the tone curve at the enlarged scale.

3. The apparatus according to claim 1, wherein said display control means comprises means for simultaneously displaying an image of partial gradations of the tone curve at an enlarged scale and an image of overall gradations of the tone curve.

4. The apparatus according to claim 3, wherein said partial gradations of the tone curve represent a highlight area.

5. The apparatus according to claim 3, further comprising:

area indicating means for indicating an area of partial gradations of the tone curve.

6. The apparatus according to claim 3, wherein said output image gradation values represent dot gains.

7. The apparatus of claim 3, wherein the enlarged scale comprises a grid representing a smaller division than a grid for the overall gradations of the tone curve.

8. An apparatus for adjusting a tone curve, displayed on a display apparatus, said apparatus for adjusting a tone curve comprising:

a tone curve display controller configured to generate a tone curve which represents the characteristics of output image gradation values with respect to input image gradation values, in response to displayed image manipulations entered via a manual command input device; and display control means for displaying an image of partial gradations of the tone curve at an enlarged scale.

9. The apparatus according to claim 8, wherein said display control means comprises means for simultaneously displaying an image of partial gradations of the tone curve at an enlarged scale and an image of overall gradations of the tone curve.

10. The apparatus according to claim 9, wherein said partial gradations of the tone curve represent a highlight area.

11. The apparatus according to claim 9, further comprising:

area indicating means for indicating an area of partial gradations of the tone curve.

12. The apparatus according to claim 9, wherein said output image gradation values represent dot gains.

13. The apparatus according to claim 9, wherein when a tone curve in the image of partial gradations of the tone curve displayed at the enlarged scale or a tone curve in the image of overall gradations of the tone curve is adjusted in response to displayed image manipulations entered via said manual command input device, the adjusted result is reflected and displayed in the tone curve in the image of partial gradations of the tone curve displayed at the enlarged scale and the tone curve in the image of overall gradations of the tone curve.

14. The apparatus according to claim 13, wherein said partial gradations of the tone curve represent a highlight area.

15. The apparatus according to claim 13, further comprising:

area indicating means for indicating an area of partial gradations of the tone curve.

16. The apparatus according to claim 13, wherein said output image gradation values represent dot gains.

17. A tone curve adjusting apparatus, a tone curve representing characteristics of output image gradation values with respect to input image gradation values for an input image, said apparatus comprising:

a display controller configured to display simultaneously an image of overall gradations of the tone curve and an image of partial gradations of the tone curve at an enlarged scale, the tone curve generated based on input image data corresponding to the input image; and command input device configured to receive displayed image manipulation commands to adjust the tone curve.

18. The apparatus of claim 17, wherein when the tone curve in the image of partial gradations of the tone curve displayed at the enlarged scale or the tone curve in the image of overall gradations of the tone curve is adjusted in response to commands received via said command input device, the adjusted result is reflected and displayed in the image of partial gradations of the tone curve displayed at the enlarged scale and in the image of overall gradations of the tone curve.

19. The apparatus of claim 18, wherein said partial gradations of the tone curve represent a highlight area.

20. The apparatus of claim 18, further comprising:

area indicator configured to indicate on the image of overall gradations of the tone curve a location of the partial gradations of the tone curve at the enlarged scale.

21. The apparatus of claim 18, wherein the output image gradation values represent dot gains.

* * * * *